US011223411B2

(12) United States Patent
Abedini et al.

(10) Patent No.: US 11,223,411 B2
(45) Date of Patent: Jan. 11, 2022

(54) SYSTEMS AND METHODS FOR JOINT BEAM SWEEP CONFIGURATION IN 5G NETWORKS

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

(*) Notice: Subject to any disclaimer, the term of this patent is extended or adjusted under 35 U.S.C. 154(b) by 128 days.

(21) Appl. No.: 16/672,282

(22) Filed: Nov. 1, 2019

(65) Prior Publication Data
US 2021/0135734 A1    May 6, 2021

(51) Int. Cl.
| | |
|---|---|
| *H04B 7/06* | (2006.01) |
| *H04B 7/0456* | (2017.01) |
| *H04W 16/28* | (2009.01) |
| *H04W 24/10* | (2009.01) |
| *H04W 56/00* | (2009.01) |

(52) U.S. Cl.
CPC ......... *H04B 7/0695* (2013.01); *H04B 7/0456* (2013.01); *H04W 16/28* (2013.01); *H04W 24/10* (2013.01); *H04W 56/001* (2013.01)

(58) Field of Classification Search
CPC .... H04B 7/0695; H04B 7/0456; H04B 7/063; H04B 7/088; H04W 16/28; H04W 24/10; H04W 56/001
See application file for complete search history.

(56) References Cited

U.S. PATENT DOCUMENTS

| | | | |
|---|---|---|---|
| 7,881,249 B2* | 2/2011 | Wheatley | H04B 7/2606 370/320 |
| 8,131,209 B1* | 3/2012 | Chen | H04B 7/15528 455/11.1 |
| 10,608,729 B1* | 3/2020 | Youtz | H04W 24/02 |

(Continued)

FOREIGN PATENT DOCUMENTS

| | | | |
|---|---|---|---|
| EP | 3720074 A1 * | 10/2020 | ........... H04B 7/0617 |
| EP | 3720074 A1 | 10/2020 | |

(Continued)

OTHER PUBLICATIONS

International Search Report and Written Opinion—PCT/US2020/055034—ISA/EPO—dated Dec. 4, 2020.

*Primary Examiner* — Ayaz R Sheikh
*Assistant Examiner* — Tarell A Hampton
(74) *Attorney, Agent, or Firm* — Qualcomm IP Dept.; James Hunt Yancey, Jr.

(57) ABSTRACT

Wireless communications systems and methods are provided for a base station (BS) to configure initial sweeping with one or more repeaters. For example, a BS may determine a sweeping configuration based on any combination of measurement reports from the repeater and/or received information on the capabilities or category of the repeater. Capabilities can include codebook information, repeater's architecture, beam switching latency, synchronization level, and/or the like. Measurement reports may be transmitted by and/or between a repeater to a BS following an initial connection setup between a repeater and a BS. Other aspects and features are also claimed and described.

30 Claims, 8 Drawing Sheets

(56) References Cited

U.S. PATENT DOCUMENTS

| | | | | |
|---|---|---|---|---|
| 2007/0070929 | A1* | 3/2007 | Kang | H04B 7/2606 370/310 |
| 2009/0003261 | A1* | 1/2009 | Kim | H04W 88/04 370/315 |
| 2011/0097992 | A1* | 4/2011 | Goransson | H04B 7/15542 455/7 |
| 2014/0348051 | A1* | 11/2014 | Park | H04W 74/0866 370/312 |
| 2015/0358129 | A1* | 12/2015 | Ryu | H04B 7/088 455/438 |
| 2016/0135070 | A1* | 5/2016 | Lee | H03M 13/09 370/252 |
| 2018/0338321 | A1* | 11/2018 | Shepard | H04W 72/14 |
| 2019/0045494 | A1 | 2/2019 | Ho et al. | |
| 2019/0174346 | A1* | 6/2019 | Murray | H04L 5/0048 |
| 2019/0182785 | A1* | 6/2019 | da Silva | H04W 48/16 |
| 2019/0215820 | A1 | 7/2019 | Cirik et al. | |
| 2019/0253986 | A1 | 8/2019 | Jeon et al. | |
| 2019/0254042 | A1 | 8/2019 | Cirik et al. | |
| 2019/0281624 | A1 | 9/2019 | Kim et al. | |
| 2019/0349915 | A1* | 11/2019 | Ahn | H04B 7/0695 |
| 2019/0380099 | A1* | 12/2019 | Hakola | H04B 7/088 |
| 2020/0112993 | A1* | 4/2020 | Tsai | H04W 72/042 |
| 2020/0205095 | A1* | 6/2020 | Strom | H04J 11/0076 |
| 2020/0212989 | A1* | 7/2020 | Reial | H04B 17/336 |
| 2020/0314662 | A1* | 10/2020 | Shimizu | H04W 48/16 |
| 2020/0336260 | A1* | 10/2020 | Liu | H04W 84/047 |
| 2020/0337115 | A1* | 10/2020 | Qin | H04L 1/1858 |
| 2020/0367193 | A1* | 11/2020 | Cha | H04W 48/10 |
| 2020/0403689 | A1* | 12/2020 | Rofougaran | H04B 7/165 |
| 2021/0013954 | A1* | 1/2021 | Zhao | H04B 7/0695 |
| 2021/0045076 | A1* | 2/2021 | Tomeba | H04B 7/0617 |

FOREIGN PATENT DOCUMENTS

| | | | | |
|---|---|---|---|---|
| WO | 2019149072 | A1 | 8/2019 | |
| WO | WO-2020032554 | A1 * | 2/2020 | H04W 36/00 |

\* cited by examiner

SYSTEMS AND METHODS FOR JOINT BEAM SWEEP CONFIGURATION IN 5G NETWORKS

TECHNICAL FIELD

The technology discussed below relates to wireless communication systems, and more particularly to joint beam sweep configuration techniques between wireless communication devices (e.g., a base station and a repeater). Embodiments and techniques can enable and provide efficient overhead in beam sweep initialization procedures and/or optimizing beam sweep patterns.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Since the wireless spectrum is not unlimited, users generally limit usage to regulated bandwidths in licensed spectrum and may at times also leverage unlicensed spectrum. This bandwidth regulation also limits the achievable data rates because data rates are generally proportional to bandwidth as governed by Shannon's law. Despite these bandwidth limitations, modern communication standards are demanding ever greater data rates. For example, the 5G wireless standard provides for data rates of up to 20 gigabits per second. The high data rates or high bandwidth may be achieved via use of millimeter wave (mmWave) for communications. However, the pathloss in mmWave bands may be high compare to lower frequency bands that are commonly used in conventional wireless communication systems. To overcome the high pathloss, beamforming may use to form directional beams for communications.

To facilitate communications and synchronization between a such as the next generation node B (gNB) and a UE, the gNB may transmit a sequence of synchronization signal blocks (SSBs) including physical synchronization signals and network system information. The gNB may transmit the sequence of SSBs by sweeping across a set of beam directions. The gNB may repeat the SSB transmissions at certain time intervals to allow the UE to perform measurements. The UE may report the measurements to the gNB. The gNB and the UE may select an optimal beam direction for subsequent communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

High data rates in 5G networks generally require efficient use of network resources to communicate with UEs. In 5G networks, wireless backhaul uses wireless communications systems to connect end user devices (e.g., UEs) to a node in a core network such as the Internet. Specifically, different cells in which the UEs are operated are connected to the core network through multi-hop wireless backhaul. Relaying in the multi-hop wireless backhaul has been implemented on the L2 or L3 layers. A more resource-efficient solution for multi-hop backhaul with lower cost and power usage is to implement relays on the L1 layer (e.g., physical layer) via repeaters. When a UE is blocked (e.g., by obstacles that physically block the signal transmission or reception between the UE and the gNB), multiple mmWave repeaters can relay uplink and downlink communications (e.g., data and controls) between the UE and the gNB. For repeaters to communicate with the gNB, the gNB can integrate the repeaters into communication (e.g., via beam sweeping) during the initial set up phase while the repeaters are idling.

For example, in an aspect of the disclosure, a method of wireless communication is provided. The method includes receiving, at a base station (BS), a measurement report and a set of parameters relating to a capability of a repeater. The method further comprises determining, by the BS, a BS sweep configuration indicative of characteristics of synchronization signal blocks (SSBs) to be used for sweeping, and a repeater sweep configuration indicative of a beamforming mode for the repeater based at least in part on any combination of the measurement report or the set of parameters. The method further comprises transmitting, from the BS to the repeater, the BS sweep configuration and the repeater sweep configuration, and performing, by the BS, initial beam sweeping with the repeater using the BS sweep configuration.

In some aspects, the method of wireless communication may be used to jointly determine the BS sweep configuration and the repeater sweep configuration. In another aspects, the BS sweep configuration and the repeater sweep configuration may be determined separately at the BS.

In another aspect of the disclosure, a BS of wireless communication is disclosed. The BS includes a transceiver configured to receive a measurement report and a set of parameters relating to a capability of a repeater. The BS further comprises a processor configured to determine a BS sweep configuration indicative of characteristics of synchronization signal blocks (SSBs) to be used for sweeping, and a repeater sweep configuration indicative of a beamforming mode for the repeater based at least in part on any combination of the measurement report or the set of parameters. The transceiver is further configured to transmit, to the repeater, the BS sweep configuration and the repeater sweep configuration and perform initial beam sweeping with the repeater using the BS sweep configuration.

In another aspect of the disclosure, a processor-readable non-transitory storage medium storing processor-executable instructions for a BS of wireless communication is disclosed. The instructions being processor-executable by a processor to perform operations comprising receiving a measurement report and a set of parameters relating to a capability of a repeater. The operations further comprise determining, by the BS, a BS sweep configuration indicative of characteristics of synchronization signal blocks (SSBs) to be used for sweeping, and a repeater sweep configuration indicative of a beamforming mode for the repeater based at least in part on any combination of the measurement report or the set of parameters. The operations further comprise transmitting, from the BS to the repeater, the BS sweep configuration and the repeater sweep configuration, and performing, by the BS, initial beam sweeping with the repeater using the BS sweep configuration.

In another aspect of the disclosure, a system of wireless communication is disclosed. The system comprises means for receiving, at a base station (BS), a measurement report and a set of parameters relating to a capability of a repeater. The system further comprises means for determining, by the BS, a BS sweep configuration indicative of characteristics of synchronization signal blocks (SSBs) to be used for sweeping, and a repeater sweep configuration indicative of a beamforming mode for the repeater based at least in part on any combination of the measurement report or the set of parameters. The system further comprises means for transmitting, from the BS to the repeater, the BS sweep configuration and the repeater sweep configuration, and means for performing, by the BS, initial beam sweeping with the repeater using the BS sweep configuration.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
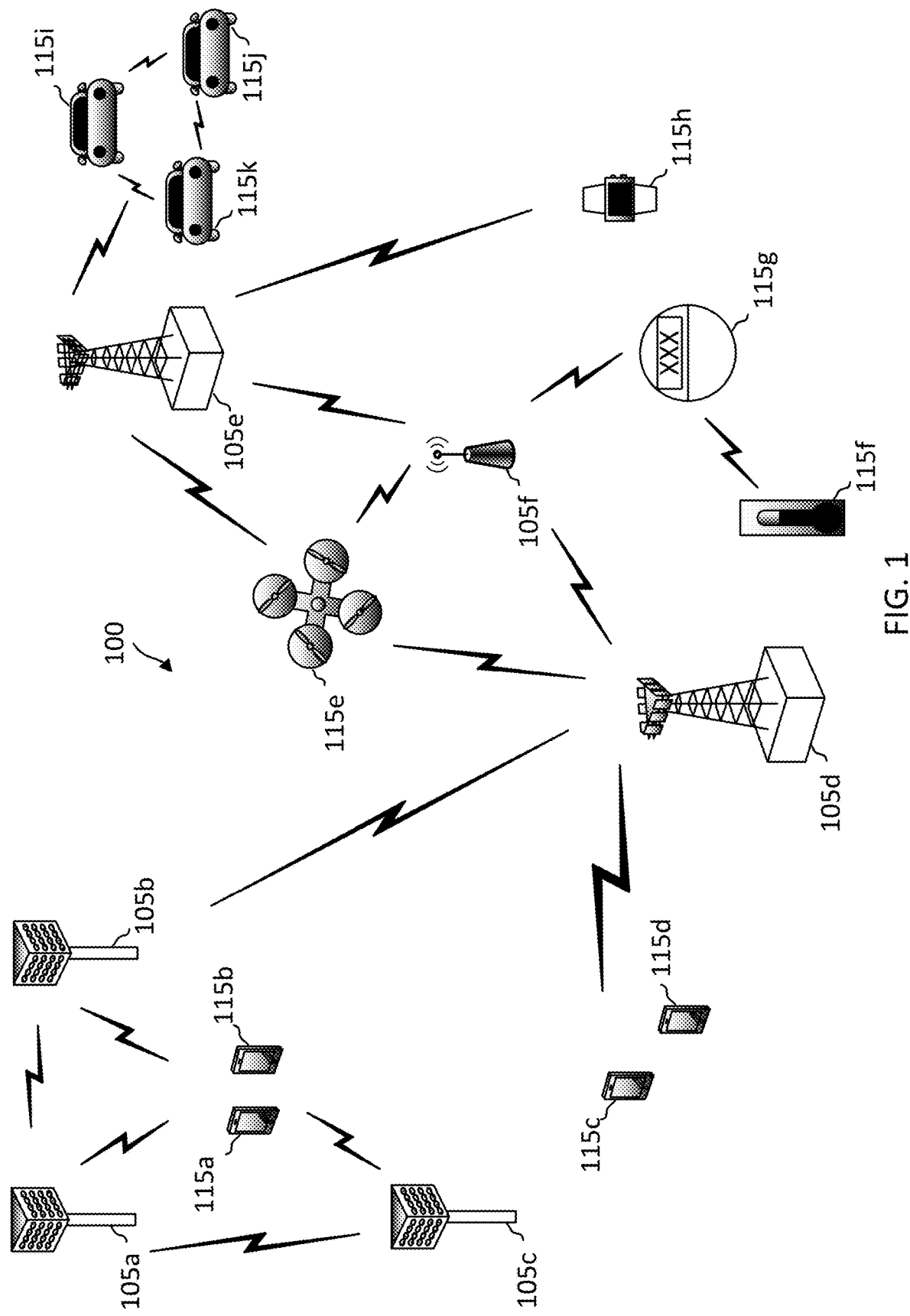
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

As used herein, the term "at least one of" refers to one or more elements from a plurality of elements. For example, at least one of A and B may refer to A, B or A and B together.

As used herein, the term "any combination of" refers to any subset of elements from a set of elements. For example, any combination of A, B and C may refer to {A}, {B}, {C}, {AB}, {BC}, {AC} or {ABC}.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR may be implemented to use optimized OFDM-based waveforms with a variety of features. Some of these features include scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In a wireless system, different cells in which UEs operate can be connected to a core network. Connections may be done through a wireless backhaul (e.g., a multi-hop backhaul). Relaying in the multi-hop wireless backhaul may be implemented on L2 or L3 layers. A more resource-efficient solution for multi-hop backhaul with lower cost and power usage is to implement relays on the L1 layer (e.g., physical layer). In some instances, this implementation can utilize one or more repeaters (e.g., repeaters within a backhaul communication link). For example, when a UE is blocked (e.g., by obstacles that physically block the signal transmission or reception between the UE and the BS), multiple repeaters (e.g., mmWave repeaters) can relay uplink and downlink communications (e.g., data and controls) between communication devices (e.g., a UE and a BS). For repeaters to communicate with a BS, the BScan integrate one or more repeaters into communication (e.g., via beam sweeping) during initial set up.

Aspects and embodiments described herein provide a mechanism for the BS to configure joint initial beam sweeping configuration of the BS and the associated repeaters. For example, a gNB may make the determination for sweeping configuration based on any combination of measurement reports from the repeater and/or received information on the capabilities or category of the repeater, including beamforming codebook information, repeater's architecture, beam switching latency, synchronization level, and/or the like. Such measurement report may be transmitted by the repeater to the gNB following an initial connection setup between the repeater and the gNB.

In some aspects, a UE may act as a repeater for another UE, e.g., to relay downlink signals to the other UE from the BS. As used herein, the term "repeater" may refer to any device that may relay signals to a UE, including a dedicated repeater, another UE, or any other devices.

FIG. 1 illustrates a wireless communication network 100 according to some aspects of the present disclosure. The network 100 may be a 5G network (e.g., private or public) and may also include a combination of radio access technologies operating in licensed and/or unlicensed spectrum. The network 100 can include a number of base stations (BSs) 105 (individually labeled as 105a, 105b, 105c, 105d, 105e, and 105f) and other network entities. A BS 105 may be a station that communicates with UEs 115, other BSs, and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, can generally cover a relatively smaller geographic area and may allow unrestricted access by UEs with service subscriptions with a network provider. A small cell, such as a femto cell, can generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC) (e.g., virtual SIM and/or physical SIM). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100.

A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs. Further, in some instances, UEs can be configured to operate as repeaters discussed herein, including the various functional and structural features. As an example, UE 115 can be configured to operate as repeaters shown in FIG. 3 (and discussed below). UEs operating as repeaters may indicate such capability to a BS, such as a serving BS.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random-access procedure to establish a connection with the BS 105. In some examples, the random-access procedure may be a four-step random access procedure. For example, the UE 115 may transmit a random-access preamble and the BS 105 may respond with a random-access response. The random-access response (RAR) may include a detected random-access preamble identifier (ID) corresponding to the random-access preamble, timing advance (TA) information, a UL grant, a temporary cell-radio network temporary identifier (C-RNTI), and/or a backoff indicator. Upon receiving the random-access response, the UE 115 may transmit a connection request to the BS 105 and the BS 105 may respond with a connection response. The connection response may indicate a contention resolution. In some examples, the random-access preamble, the RAR, the connection request, and the connection response can be referred to as message 1 (MSG1), message 2 (MSG2), message 3 (MSG3), and message 4 (MSG4), respectively. In some examples, the random-access procedure may be a two-step random access procedure, where the UE 115 may transmit a random-access preamble and a connection request in a single transmission and the BS 105 may respond by transmitting a random-access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115.

The retransmission may include the same coded version of DL data as the initial transmission. Alternatively or additionally, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

Base stations are not the only entities that may function as a scheduling entity. In some examples, a UE may function as a scheduling entity and may schedule resources for one or more subordinate entities (e.g., one or more other UEs and/or repeaters), and the other UEs may utilize the resources scheduled by the UE for wireless communication. In some examples, a UE and/or repeater may function as a scheduling entity in a peer-to-peer (P2P) network, and/or in a mesh network. In a mesh network example, UEs may communicate directly with one another in addition to communicating with a scheduling entity.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a look-before-talk (LBT) procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
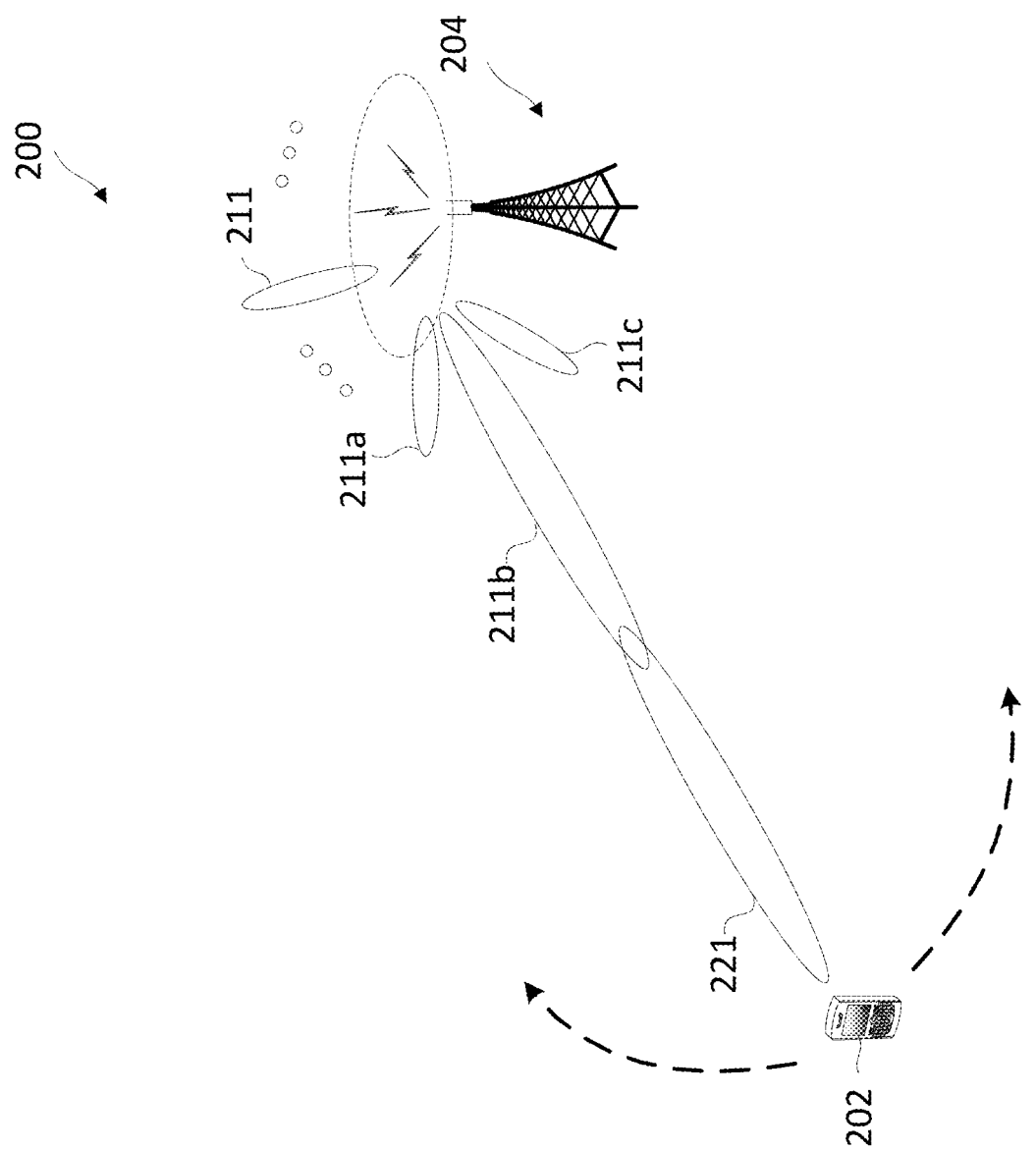
FIG. 2 illustrates an initial random-access scheme via beamforming between a UE and a BS and in the wireless communication network shown in FIG. 1, according to aspects of the present disclosure.

FIG. 2 illustrates an initial random-access scheme via beamforming between a UE and a BS and in the wireless communication network shown in FIG. 1, according to aspects of the present disclosure. The network 200 corresponds to a portion of the network 100. FIG. 2 illustrates one BS 204 and one UE 202 for purposes of simplicity of discussion, though it will be recognized that aspects of the present disclosure may scale to many more UEs 202 and/or BSs 204. The BS 204 corresponds to one of the BSs 104. The UE 202 corresponds to one of the UEs 102. The UE 202 and BS 204 may communicate with each other at any suitable frequencies.

In FIG. 2, BS 204 sends synchronization signals, BRSs, and system information over a plurality of directional beams 211 in a plurality of directions as shown by the dashed oval 220. To access the network 200, UE 202 listens to the synchronization signals and/or the BRSs and selects a beam for performing a random-access procedure. For example, UE 202 can receive the beams 211a, 211b, and 211c and selects the beam 211b for the random access. The UE 202 sends a random-access preamble over a beam 221 in the beam direction of the beam 211b and monitors for a RAR from BS 204. Upon detecting the random-access preamble, BS 204 sends a RAR over the beam 211b in the same beam direction at which the random-access preamble is received. The BS 204 sends the RAR over the beam 211b using an entire subframe.

As shown in FIG. 2, the communication between UE 202 and BS 204 relies on directional beams formed at a certain direction, e.g., towards the UE 202 or BS 204. When the physical communication has been blocked, e.g., by a physical blocker, between the BS 204 and UE 202, the signal exchange between the BS 204 and UE 202 cannot be implemented via such directional beams. In 5G networks, an integrated access backhaul (IAB) solution is adopted to connect cells, e.g., IAB-nodes such as the UEs, etc. to the core network. For example, when a blockage exists within the cell of a BS 204 that blocks the communication between the BS 204 and a UE 202, a relay node, such as a L1-layer mmW repeater may be connected to the BS 204 and relay signals to the target UE 202, as further illustrated in FIG. 3.

Figure 3:
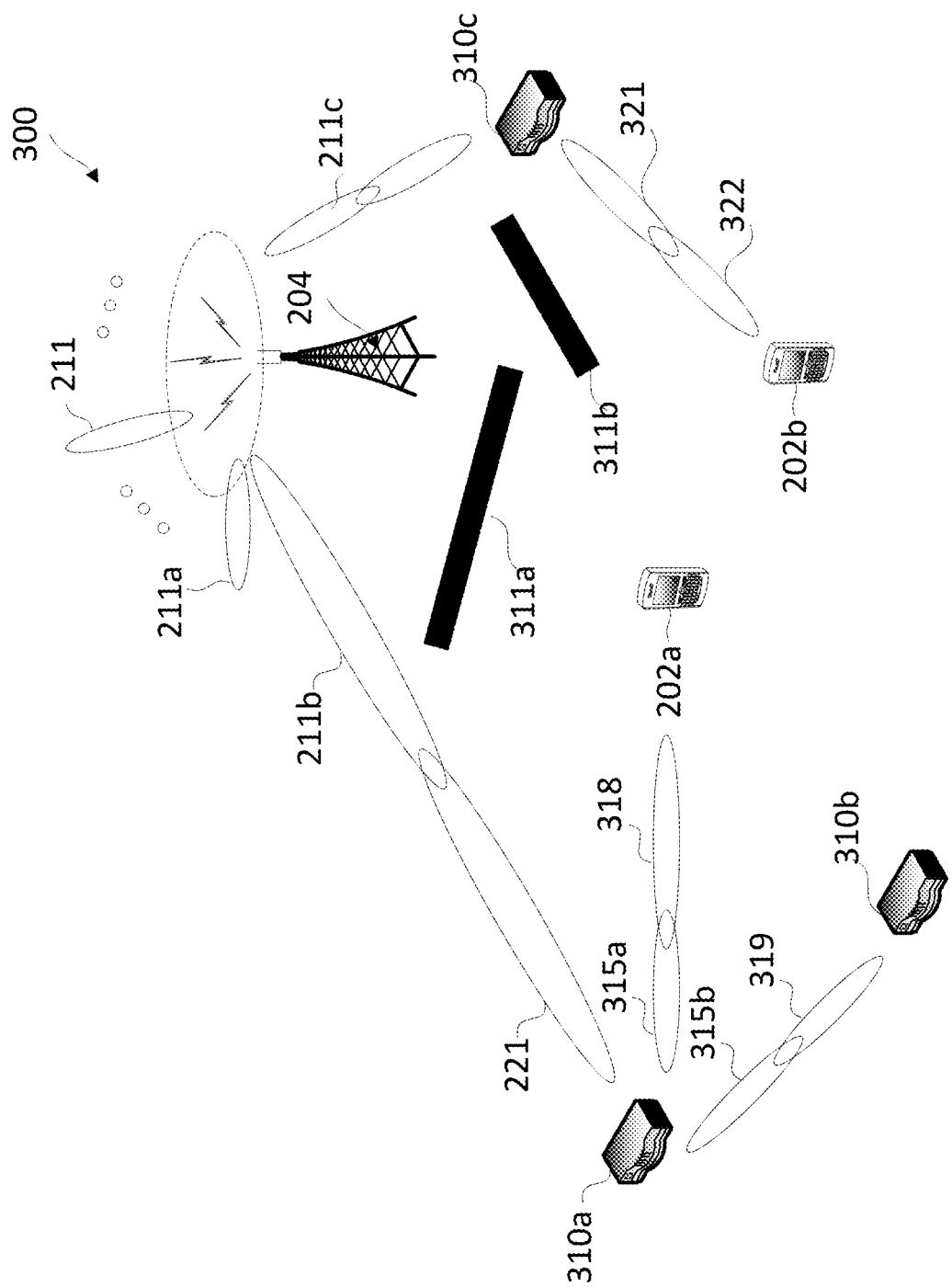
FIG. 3 illustrates a wireless backhaul relay network with L1-layer mmW repeaters that may be implemented in the wireless communication network shown in FIGS. 1-2, according to some aspects of the present disclosure.

FIG. 3 illustrates a wireless backhaul relay network that can include one or more repeaters. In some instances, the network can include a L1-layer mmW repeaters that may be implemented in the wireless communication network shown in FIGS. 1-2, according to some aspects of the present disclosure. Repeaters may be configured as stand-alone repeater devices and other devices (such as UEs) may also be labelled as repeaters if these devices are configured to include repeater functionality. At high frequencies of mmWave (e.g., above 6 GHz), physical blockage of signals may often occur in the wireless environment. Blockage may be due to physical objects (e.g., humans, buildings, trees, cars, walls, etc.) and/or also environmental occurrences (e.g., weather, rain, snow, dense environments, sporting venues, debris, particulate matter, etc.). Diagram 300 shows a wireless network similar to that of diagram 200 but with blockage 311a that blocks signals between BS 204 and UE 202a, and blockage 311b that blocks signals between BS 204 and UE 202b.

A number of L1 mmW repeaters 310a-c may be used to provide relay of signals against blockage so as to extend the coverage of the mmW cell. Each L1 mmW repeater includes receiver antennas configured to receive analog signals based on configured receiver beamforming. The L1 mmW repeater also includes an amplifier configured to amplify the power of the received analog signal and transmitter antennas to transmit the amplified signal based on configured transmitter beamforming. The L1 mmW repeater further includes a control interface configured to communicate control signals with a server (e.g., a donor, a control node, etc.) via out-of-band communication (e.g. using a different radio technology, or different frequency (e.g., LTE narrowband Internet of Things (NB-IoT), etc.), or in-band communication (e.g. using a smaller bandwidth part of the same carrier frequency).

For example, instead of exchanging information through beams 211b and 211 with a UE directly, BS 204 may transmit information to repeater 310a via beam 211b and receive information from repeater 310a from beam 221 in the beam direction of beam 211b. The repeater 310a may in turn relay information obtained from BS 204 to UE 202a via beam 315a and receive information from UE 202a via beam 318. In this way, BS 204 may communicate with UE 202 even in view of the physical blockage 311a.

Similarly, in view of physical blockage 311b, repeater 310c may relay information from BS 204 to UE 202b through beam 321 and receive information from UE 202b via beam 322 to relay to BS 204.

The repeaters may further expand coverage of the mmW cell. For example, repeater 310a may further relay any information from BS 204 to another repeater 310b via beams 315b and 319, which may in turn connect to another UE. In this way, through multi-hop relays by repeaters, BS 204 may be able to cover UEs in a wide physical range.

For the repeaters 310a-b to communicate with the BS 204, BS 204 can integrate the repeaters 310a-b into communication (e.g., via beam sweeping) during the initial set up phase while the repeaters 310a-b are idling. For example, a repeater 310a or 310c, with in-band control, may initially follow an access procedure (similar to a UE) to establish a connection to BS 204, and get authentication. As part of this process, the repeater 310a or 310c may share information about its beamforming codebook with BS 204 to provide information on what beams the repeater 310a or 310c is able to create. Further details relating to the initial integration of an in-band repeater can be found in co-pending and commonly-owned U.S. Provisional Application No. 62/892,322, filed 27 Aug. 2019, which is hereby expressly incorporated herein by reference in its entirety.

In some embodiments, the initial beam sweeping performed by BS 204 with repeaters 310a or 310c may be transparent to the UEs, e.g., UE 202a or 202b, and consistent with access procedures followed by legacy users. For example, the initial beam sweeping may following any of the beamforming options: (i) a single broad beam is formed from the repeater and only the BS sweeps; (ii) time-division multiplexing of SSB beams are formed from the BS and the repeaters connected to the BS, which are coordinated by the BS such that during the beam sweep the BS maintains the best beam to the repeater; and (iii) each repeater sweeps on selected SSB beams from the BS that have reasonable reference signal received powers such that the repeater determines where to apply a broad beam and where to apply a narrow beam based on the received reference signal received power from the BS. Further details relating to different modes of initial beam sweep can be found in co-pending and commonly-owned U.S. Provisional Application No. 62/892,519, filed 27 Aug. 2019, which is hereby expressly incorporated herein by reference in its entirety.

For each of the initial beam sweep modes, BS 204 can determine the beam sweep configuration parameters for both the BS and the repeater. For example, if the repeater shares a hierarchical codebook which contains information on what beams of different beam widths the repeater is able to generate, which level should be used for the initial sweep, etc., such information may be considered by BS 204 to configure the initial beam sweep with the repeater. For another example, if the repeater is able to create a composite beam (e.g. over two separate panels), BS 204 may evaluate whether to configure the initial beam sweep that allows the repeater to forward SSBs to UEs using the composite beam. For another example, if some beam directions of the repeater are not useful (e.g. blocked by a nearby object, or overlapping with the coverage region of another repeater or another BS), then BS 204 may determine whether to exclude beams in those directions for the repeater. As further described in relation to FIGS. 6-8, embodiments described herein provide a mechanism for the BS 204 to configure joint initial beam sweeping configuration of the BS 204 and the associated repeaters (e.g., 310a or 310c).

Figure 4:
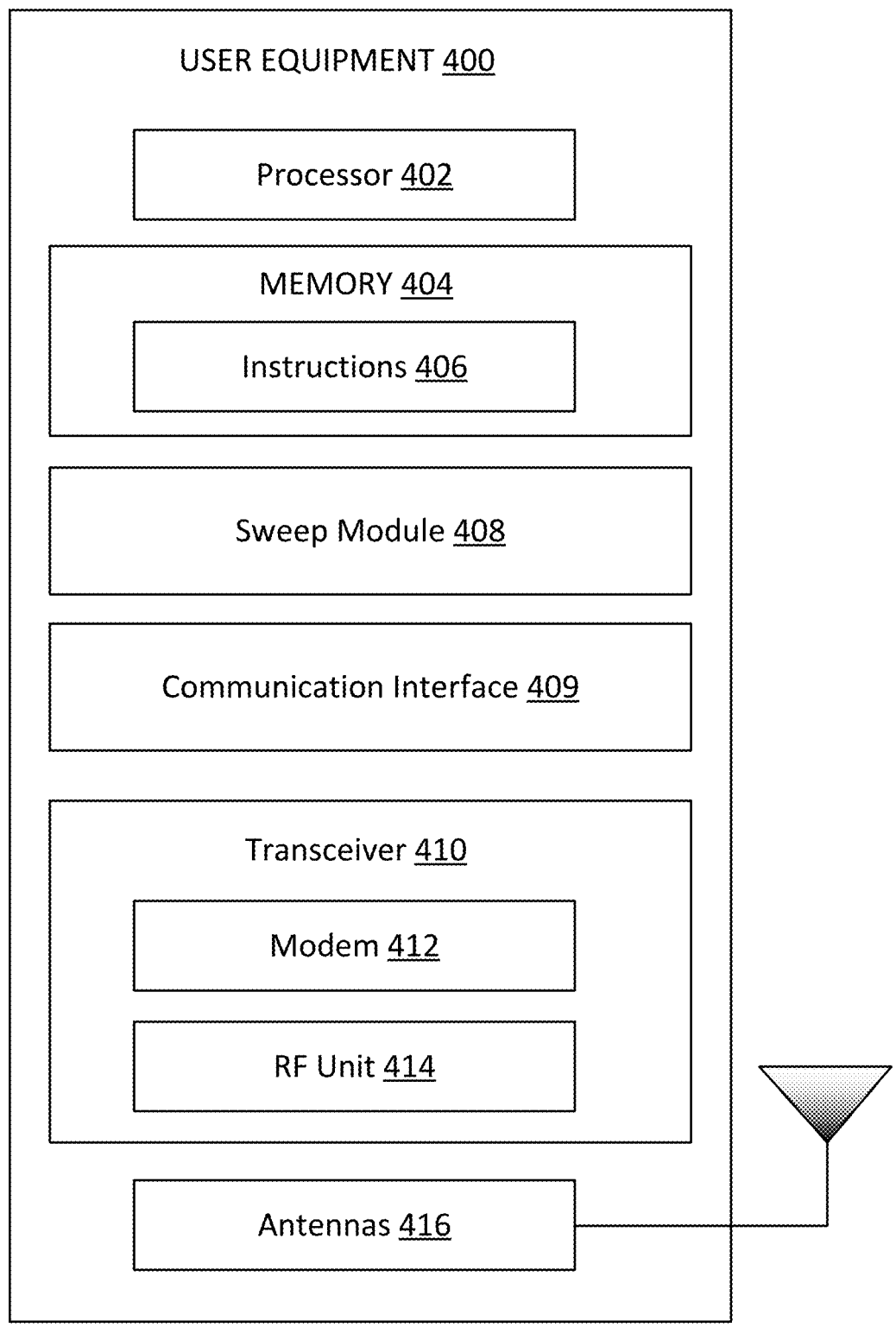
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1, UE 202 in FIG. 2, or any of repeaters 310a-c in FIG. 3, for example. As shown, the UE 400 may include a processor 402, a memory 404, a sweep module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include numerous components. These can include, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration. In some scenarios, the processor 402 may include an internal set of memory storage features (e.g., registers, buffers, and/or other storage enabling internal functions). In other arrangements the processor may be coupled to an external memory (like memory 404) and/or internal, integrated memory Memory 404 may also include a variety of features. For example, the memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sweep module 408 may communicate with the communication interface 409 to receive from or transmit messages to another device. Each of the sweep module 408 and the communication interface 409 may be implemented via hardware, software, or combinations thereof. For example, each of the sweep module 408 and the communication interface 409 may be implemented as a processor, circuit, and/or instructions 406 stored in the memory 404 and executed by the processor 402. In some examples, the sweep module 408 and the communication interface 409 can be integrated within the modem subsystem 412. For example, the sweep module 408 and the communication interface 409 can be implemented by a combination of software components (e.g., executed by a DSP or a general processor) and hardware components (e.g., logic gates and circuitry) within the modem subsystem 412. In some examples, a UE may include one of the sweep module 408 and the communication interface 409. In other examples, a UE may include both the sweep module 408 and the communication interface 409.

The sweep module 408 and the communication interface 409 may be used for various aspects of the present disclosure, for example, aspects of FIGS. 3 and 6-8. The sweep module 408 is configured to receive from a BS (e.g., 204) system information that includes sweep configuration for the UE 400, based on which the sweep module 408 may configure the beam directions and/or other parameters to receive initial sweep from a BS. The communication interface 409 is configured to coordinate with the sweep module 408 to receive system information from the BS, and/or communicate with the BS according to the UL and/or DL scheduling grants. In some scenarios, the sweep module 408 and communication interface 409 may be coupled (directly or indirectly) or otherwise in electrical communication with the transceiver 410.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the sweep module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide modulated and/or processed data. This can include, for example, data packets or, more generally, data messages that may contain one or more data packets and other information. The RF unit can include one or more antennas 416 for transmission to one or more other devices. The antennas 416 may further receive data messages transmitted from other devices. The antennas 416 may provide received data messages for processing and/or demodulation to the transceiver 410. The transceiver 410 may provide the demodulated and decoded data (e.g., DL data blocks, PDSCH, PUSCH, BWP hopping configurations and/or instructions) to the sweep module 408 and/or communication interface 409 for processing. The antennas 416 may include multiple antennas of similar or different designs to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
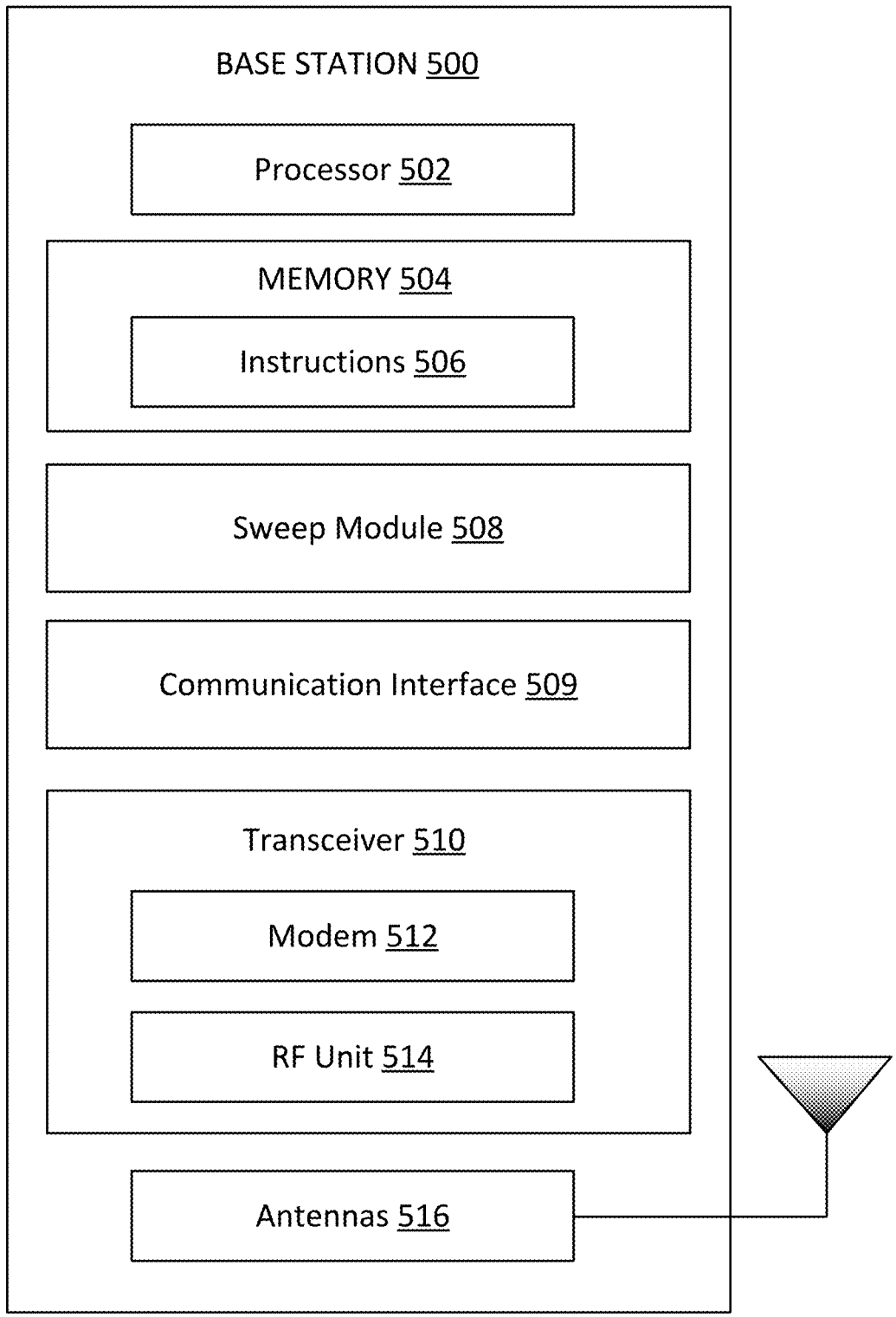
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a sweep module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The sweep module 508 may communicate with the communication interface 509 to receive from or transmit messages to another device. Each of the sweep module 508 and the communication interface 509 may be implemented via hardware, software, or combinations thereof. For example, each of the sweep module 508 and the communication interface 509 may be implemented as a processor, circuit, and/or instructions 506 stored in the memory 504 and executed by the processor 502. In some examples, the sweep module 508 and the communication interface 509 can be integrated within the modem subsystem 512. For example, the sweep module 508 and the communication interface 509 can be implemented by a combination of software components (e.g., executed by a DSP or a general processor) and hardware components (e.g., logic gates and circuitry) within the modem subsystem 512. In some examples, a UE may include one of the sweep module 508 and the communication interface 509. In other examples, a UE may include both the sweep module 508 and the communication interface 509.

The sweep module 508 and the communication interface 509 may be used for various aspects of the present disclosure, for example, aspects of FIGS. 3 and 6-8. The sweep module 508 is configured to broadcast system information that sweep configuration for both the BS 500 and a repeater or UE. The sweep module 508 is further configured to perform an initial sweeping with repeaters in the same cell of the BS 500.

The communication interface 509 is configured to coordinate with the sweep module 508 to broadcast system information, or to transmit initial sweeping signals to repeaters.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., LDPC coding, polar coding, turbo coding, convolutional coding, digital beamforming, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide modulated and/or processed data. This can include, for example, data packets or, more generally, data messages that may contain one or more data packets and other information. The RF unit 514 can provide data or information to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the sweep module 508 and/or communication interface 509 for processing. The antennas 516 may include multiple antennas of similar or different designs to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
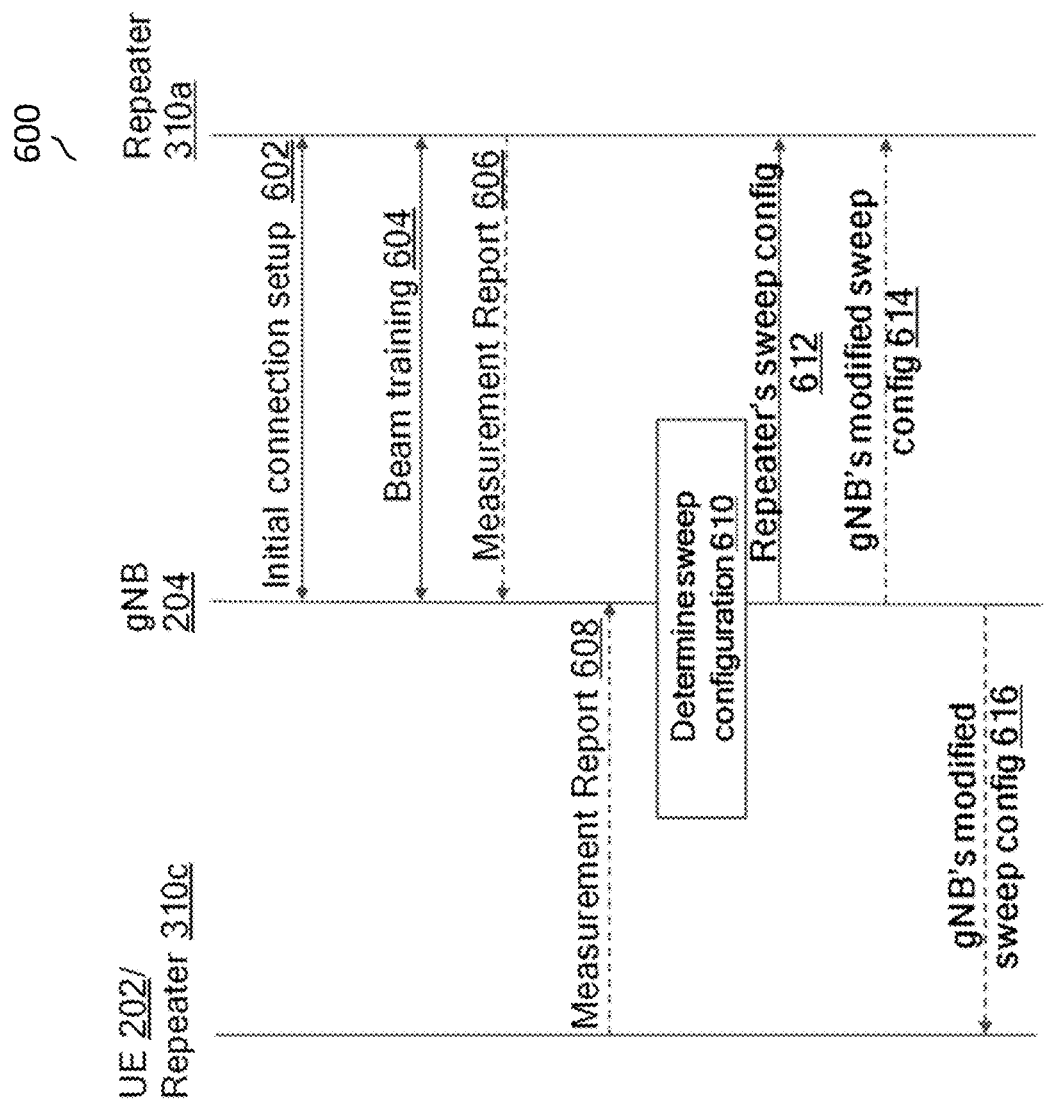
FIG. 6 illustrate an interaction between a UE or repeater and a BS to set up sweep configuration for both the BS and the repeater, according to some aspects of the present disclosure.

FIG. 6 illustrates an interaction between a UE or repeater and a BS to set up sweep configuration for both the BS and the repeater, according to some aspects of the present disclosure. The UE 202 or repeaters 310a or 310c and BS, e.g., a gNB 204 may correspond to the UE 202a-b, repeaters 310a or 310c and BS 204 shown in FIG. 3. For example, gNB 204 may communicate with repeaters 310a or 310c directly, which may in turn relay information to other UEs (e.g., UE 202a or 202bm respectively).

Specifically, a repeater 310a, with in-band control, may initially follow an access procedure (similar to the access procedure used by a UE) to establish a connection to the gNB 204 as the initial connection setup 602. As part of the initial connection setup 602, the repeater 310a may share information about the beamforming codebook with the gNB 204. For example, the beamforming codebook contains information on what beams the repeater 310a is able to create. In some embodiments, repeater 310a may further share with gNB 204 additional capability and configuration information, such as, but not limited to, information on the architecture of the repeater, beam switching latency, synchronization level, etc.

During beam training 604 between repeater 310a and gNB 204, information (e.g., control and/or beam-based information) can be exchanged. This can include one or more reference signals that may be sent on the downlink (by gNB 204), or uplink (by the repeater 310a), and measurements of such reference signals may be conducted by the receiver (e.g., either gNB 204 or repeater 310a measures the received signals). For example, the repeater 310a may conduct measurement of downlink signals from the gNB 204, or another gNB, uplink measurements from UEs (e.g., UE 202a), other assisting sensor information that the repeater 310a may share (e.g. the presence of a blocker/reflector 311a-b along some direction and at some distance from the repeater 310a, etc.), and/or the like. For another example, the gNB 204 may perform measurement of the signals from repeater 310a or reported by other nodes to the gNB 204 (e.g., from other UEs or other gNBs).

The repeater 310a may send the measurement report 606 to gNB 204. Based on the measurement reports 606 and/or 608 from various repeaters 310a or 310c, gNB may conduct a determination of the sweep configuration 610. Specifically, for the determination of sweep configuration 610, the gNB 204 may determine a BS beam sweep configuration, and a repeater sweep configuration. For example, for the BS beam sweep configuration, the gNB 204 determines how many SSBs are to be transmitted, at which beam directions to transmit the SSBs, in what beam sweep order and/or SSB transmission order to transmit the SSBs, and the sweeping periodicity/frequency. For the repeater beam sweep configuration, the gNB 204 determines a beamforming mode for the repeater, e.g., whether (i) a single broad beam, (ii) a time division multiplexing of SSB beams received from gNB 204, or (iii) a repeater selected SSB beam will be used. For the repeater beam sweep configuration, the gNB 204 may further determine for each determine beamforming mode, which SSBs are for the repeater to forward to the UE, what transceiver beams to use for the forwarding, and the transmitter power level to be used to forward the SSBs to the UE.

In some embodiments, the gNB 204 makes the determination for sweeping configuration based on any combination of received information on the capabilities or category of the repeater received at initial connection setup 602, such as, but not limited to codebook information (including number of beams, quasi co-location (QCL) info, number of spatial layers, beam widths, etc.), the architecture of the repeater, the beam switching latency, the synchronization level, and/or the like. For example, based on the architecture of repeater 310a, if the repeater 310a can forward SSBs from the gNB 204 using a composite beam (across two antenna array panels), then the gNB 204 decides whether to make a composite beam with a 3 dB less transmitter power per beam or sweep two separate beams (with full power). For another example, based on the synchronization level of the repeater 310a, if the repeater with out-of-band control may not be tightly synchronized to the timing of the gNB 204, and hence may not have symbol-level synchronization, the gNB 204 may determine the repeater sweep configuration to prevent the repeater 310a from switching beams across two consecutive SSBs (in consecutive transmission periods). The order of beam directions may be adjusted accordingly.

Additional parameters that may be used by the gNB 204 in determining sweeping configuration may further include measurement reports. These can include reports from one or more repeaters (such as 606 or 608 from repeaters). The reports may include one or more measurements of downlink signals from the gNB 204, or another gNB, uplink measurements from UEs, other assisting sensor information that a repeater may share (e.g. presence of a blocker/reflector along some direction and at some distance from the repeater), and/or the like. The gNB 204 may further consider measurements of signals from repeaters or other UEs/gNB performed by the gNB 204 itself, and location information of the repeater (and other repeaters).

Upon determining a sweeping configuration for the gNB 204 and an associated repeater 310a, this information may be exchanged or shared. For example, the gNB 204 may transmit a BS's repeater sweep configuration and a repeater's sweep configuration 612 to the repeater 310a. The gNB 204 may perform initial beam sweeping according to the determined BS sweep configuration, and the repeater 310a may in turn receive beam sweeping signals from gNB 204 according to the repeater beam configuration. In some embodiments, the gNB 204 may update the BS beam sweep configuration periodically, constantly, or intermittently, e.g., following changes of the network or channel conditions, which may subsequently lead to an update with the connected UEs/repeaters. For example, the gNB 204 may send the modified sweep configuration (both for the BS and for the repeater) 614 and 616 to repeater 310a and/or other UE 202, repeater 310c, etc., via system information.

Figure 7:
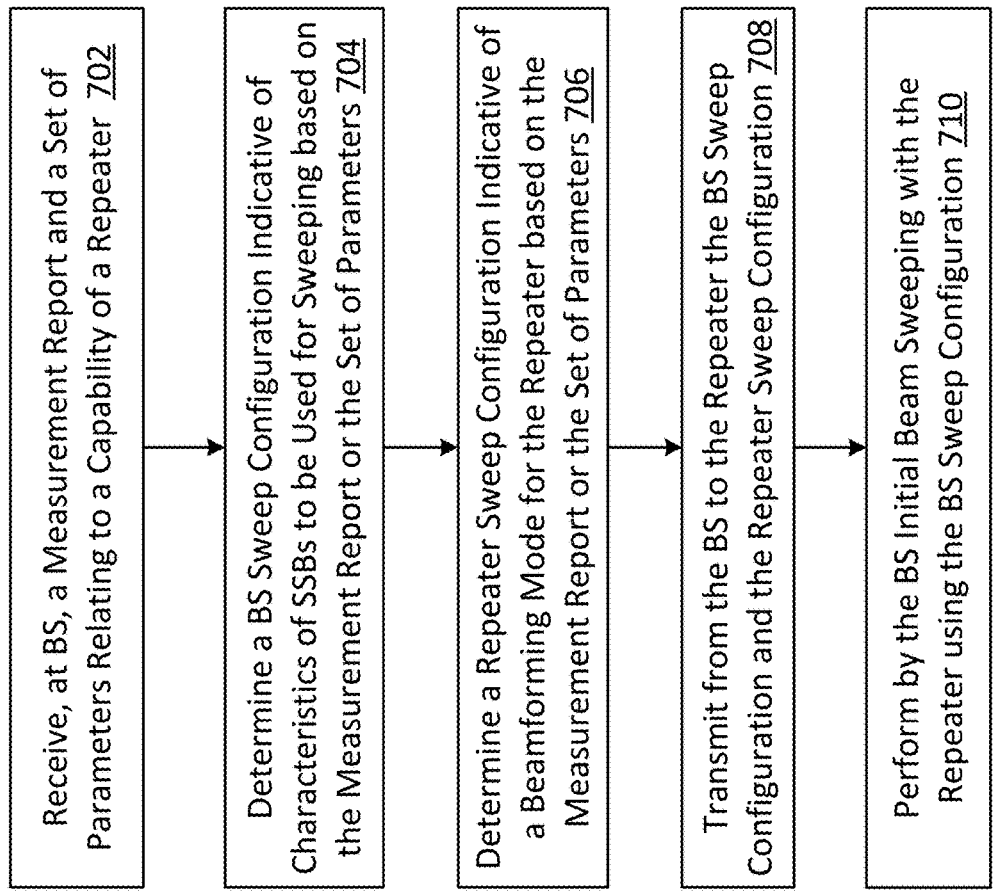
FIG. 7 is a logic flow diagram illustrating a method for a BS to determine sweep configuration for the BS and a repeater, according to some aspects of the present disclosure.

FIG. 7 is a logic flow diagram illustrating a method for a BS to determine sweep configuration for the BS and a repeater, according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the BS/gNB 204, BS 500, may utilize one or more components, such as the processor 502, the memory 504, the sweep module 508, the communication interface 509, the transceiver 510, the modem 512, and the one or more antennas 516, to execute the steps of method 700. As illustrated, the method 700 includes a number of enumerated steps, but aspects of the method 700 include additional steps before, after, and in between the enumerated steps. In some aspects, one or more of the enumerated steps may be omitted or performed in a different order.

At step 702, a BS may receive a measurement report and a set of parameters relating to a capability of a repeater, e.g., from the repeater. For example, as shown in FIG. 6, the set of parameters may be received via an initial connection setup stage 602 between the BS and the repeater. The term "set of" is used herein to referred to one or more types of parameters. For example, the set of received parameters relating to the capability of the repeater may include, but not limited to information such as the codebook information, repeater architecture information, beam switching latency, synchronization level, etc. The measurement report (e.g., 606) prepared by the repeater may include measurement of downlink signals from the BS at the repeater, or uplink signals from other UEs to the repeater.

At step 704, the BS determines a BS sweep configuration indicative of characteristics of SSBs to be used for sweeping based on the measurement report or the set of parameters. Specifically, the term "indicative of" refers that the BS sweep configuration may contain information related to the characteristics of SSBs. For example, the BS sweep configuration includes information relating to how many SSBs to transmit, which beam directions to transmit the SSBs, what beam order or order of SSBs to transmit, and the sweeping periodicity.

At step 706, the BS determines a repeater sweep configuration indicative of a beamforming mode for the repeater based on the measurement report or the set of parameters. Specifically, the term "indicative of" refers that the repeater sweep configuration may contain information related to the beamforming mode of the repeater. For example, the BS determines a beamforming mode for the repeater, e.g., whether (i) a single broad beam, (ii) a time division multiplexing of SSB beams received from gNB 204, or (iii) a repeater selected SSB beam will be used. For the repeater beam sweep configuration, the BS may further determine for each determine beamforming mode, which SSBs are for the repeater to forward to the UE, what transceiver beams to use for the forwarding, and the transmitter power level to be used to forward the SSBs to the UE.

At step 708, the BS transmits to the repeater the BS sweep configuration and the repeater sweep configuration, e.g., as shown at 612 and 614 in FIG. 6.

At step 710, the BS may perform the initial beam sweeping with the repeater using the BS sweep configuration parameters.

Figure 8:
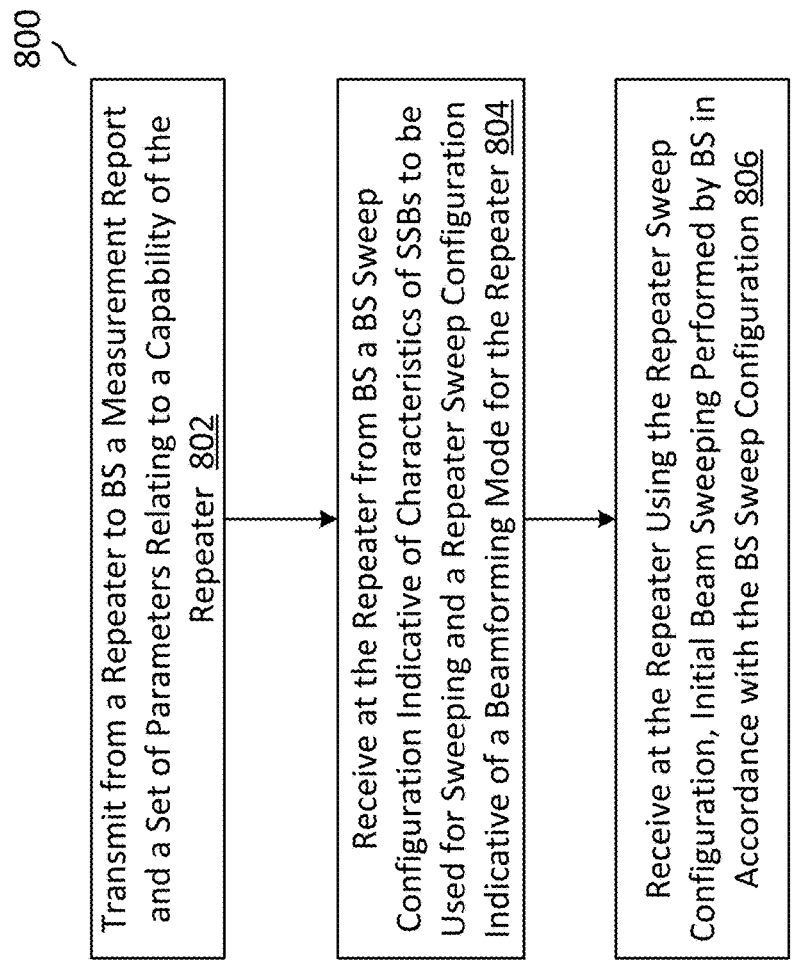
FIG. 8 is a logic flow diagram illustrating a method for a repeater to obtain sweep configuration from the BS, according to some aspects of the present disclosure.

FIG. 8 is a logic flow diagram illustrating a method for a repeater to obtain sweep configuration from the BS, according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the UE 115, UE 202 or UE 400, repeaters 310a-c, may utilize one or more components, such as the processor 402, the memory 404, the sweep module 408, the communication interface 409, the transceiver 410, the modem 412, and the one or more antennas 416, to execute the steps of method 800. As illustrated, the method 800 includes a number of enumerated steps, but aspects of the method 800 include additional steps before, after, and in between the enumerated steps. In some aspects, one or more of the enumerated steps may be omitted or performed in a different order.

At step 802, the repeater may transmit to the BS a measurement report and a set of parameters relating to a capability of the repeater. For example, the set of parameters may be transmitted during the initial connection setup 602 in FIG. 6.

At step 804, the repeater may receive, from the BS, the BS sweep configuration indicative of characteristics of SSBs to be used for sweeping, and the repeater sweep configuration indicative of a beamforming mode for the repeater.

At step 806, the repeater may receive, using the repeater sweep configuration, initial beam sweeping performed by the BS in accordance with the BS sweep configuration. For example, the repeater may receive SSBs from the initial beam sweeping under the beamforming mode defined in the BS sweep configuration, and then select SSBs from the received SSBs to forward to a UE based on the BS sweep configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
    receiving, at a base station (BS), at least one of a measurement report and a set of parameters relating to a capability of a repeater;
    transmitting, by the BS, at least one of a BS sweep configuration related to characteristics of synchronization signal blocks (SSBs) to be used for sweeping, or a repeater sweep configuration related to a beamforming mode for the repeater based at least in part on any combination of the measurement report or the set of parameters,
        the BS sweep configuration or the repeater sweep configuration indicating whether a beam in a certain beam direction is to be excluded when the certain beam direction is blocked or overlaps with a covered region of another repeater or another BS;
    and
    performing, by the BS, initial beam sweeping with the repeater using the BS sweep configuration.

2. The method of claim 1, further comprising:
    updating, by the BS, the BS sweep configuration; and
    transmitting, from the BS to the repeater or a user equipment (UE), the updated BS sweep configuration via system information.

3. The method of claim 1, wherein the determining the BS sweep configuration comprises:
    determining any combination of a number of SSBs to transmit, one or more directions to transmit the number of SSBs, an order to transmit the number of SSBs, and transmission periodicity of the number of SSBs during the initial sweeping.

4. The method of claim 1, wherein the determining the repeater sweep configuration comprises:
    determining, for the beamforming mode, any combination of a number of SSBs to forward to a UE, a number of beams to use for forwarding the number of SSBs, and a number of transmit power levels to use for forwarding the number of SSBs.

5. The method of claim 1, wherein the measurement report comprises information relating to any combination of:
    a measurement of downlink signals from the BS or another BS to the repeater;
    a measurement of uplink signals from a UE to the BS; and
    a presence of a blocker or reflector at a distance along a direction from the repeater sensed by the repeater.

6. The method of claim 1, wherein the set of parameters relating to the capability of the repeater comprises any combination of:
    beamforming codebook information of the repeater;
    an architecture of the repeater;
    a beam switching latency of the repeater; and
    a synchronization level of the repeater.

7. The method of claim 1, wherein the set of parameters relating to the capability of the repeater is received by the BS from the repeater during an initial connection setup between the BS and the repeater.

8. The method of claim 1, further comprising:
    performing, by the BS, a measurement of signals from the repeater; and
    using the measurement of signals from the repeater in determining the BS sweep configuration and the repeater sweep configuration.

9. The method of claim 1, further comprising:
receiving, by the BS, location information of the repeater; and
using the location information of the repeater in determining the BS sweep configuration and the repeater sweep configuration.

10. The method of claim 1, wherein the determining the BS sweep configuration or the repeater sweep configuration further comprises:
determining the BS sweep configuration or the repeater sweep configuration based on any combination of:
a measurement of downlink signals from the BS or another BS to the one or more repeaters or UEs;
a measurement of uplink signals from the one or more repeaters or UEs to the BS;
a presence of a blocker or reflector at a distance along a direction from the one or more repeaters sensed by the one or more repeaters;
beamforming codebook information of the one or more repeaters;
an architecture of the one or more repeaters;
a beam switching latency of the one or more repeaters;
a synchronization level of the one or more repeaters;
a measurement performed by the BS, of signals from the one or more repeaters or UEs; and
location information of the one or more repeaters or UEs.

11. A base station (BS) of wireless communication, comprising:
a transceiver configured to receive at least one of a measurement report and a set of parameters relating to a capability of a repeater;
a processor configured to transmit at least one of a BS sweep configuration related to characteristics of synchronization signal blocks (SSBs) to be used for sweeping, or a repeater sweep configuration related to a beamforming mode for the repeater based at least in part on any combination of the measurement report or the set of parameters,
the BS sweep configuration or the repeater sweep configuration indicating whether a beam in a certain beam direction is to be excluded when the certain beam direction is blocked or overlaps with a covered region of another repeater or another BS; and
wherein the transceiver is further configured to:
perform initial beam sweeping with the repeater using the BS sweep configuration.

12. The BS of claim 11, wherein the processor is further configured to:
update the BS sweep configuration; and
wherein the transceiver is further configured to transmit, from the BS to the repeater or a connected user equipment (UE), the updated BS sweep configuration via system information.

13. The BS of claim 11, wherein the processor is further configured to determine the BS sweep configuration by:
determining any combination of a number of SSBs to transmit, one or more directions to transmit the number of SSBs, an order to transmit the number of SSBs, and transmission periodicity of the number of SSBs during the initial sweeping.

14. The BS of claim 11, wherein the processor is further configured to determine the repeater sweep configuration by:
determining, for the beamforming mode, any combination of a number of SSBs to forward to a UE, a number of beams to use for forwarding the number of SSBs, and a number of transmit power levels to use for forwarding the number of SSBs.

15. The BS of claim 11, wherein the measurement report comprises information relating to any combination of:
a measurement of downlink signals from the BS or another BS to the repeater;
a measurement of uplink signals from a UE to the BS; and
a presence of a blocker or reflector at a distance along a direction from the repeater sensed by the repeater.

16. The BS of claim 11, wherein the set of parameters relating to the capability of the repeater comprises any combination of:
beamforming codebook information of the repeater;
an architecture of the repeater;
a beam switching latency of the repeater; and
a synchronization level of the repeater.

17. The BS of claim 11, wherein the set of parameters relating to the capability of the repeater is received by the BS from the repeater during an initial connection setup between the BS and the repeater.

18. The BS of claim 11, wherein the transceiver is further configured to perform, by the BS, a measurement of signals from the repeater; and
wherein the processor is further configured to use the measurement of signals from the repeater in determining the BS sweep configuration and the repeater sweep configuration.

19. The BS of claim 11, wherein the transceiver is further configured to receive, by the BS, location information of the repeater; and
wherein the processor is further configured to use the location information of the repeater in determining the BS sweep configuration and the repeater sweep configuration.

20. The BS of claim 12, wherein the processor is further configured to determine the BS sweep configuration, or the repeater sweep configuration by:
determining the BS sweep configuration or the repeater sweep configuration based on any combination of:
a measurement of downlink signals from the BS or another BS to the one or more repeaters or UEs;
a measurement of uplink signals from the one or more repeaters or UEs to the BS;
a presence of a blocker or reflector at a distance along a direction from the one or more repeaters sensed by the one or more repeaters;
beamforming codebook information of the one or more repeaters;
an architecture of the one or more repeaters;
a beam switching latency of the one or more repeaters;
a synchronization level of the one or more repeaters;
a measurement performed by the BS, of signals from the one or more repeaters or UEs; and
location information of the one or more repeaters or UEs.

21. A method of wireless communication, comprising:
transmitting, from a repeater to a base station (BS), at least one of a measurement report and a set of parameters relating to a capability of the repeater;
receiving, at the repeater from the BS, a BS sweep configuration related to characteristics of synchronization signal blocks (SSBs) to be used for sweeping, or a repeater sweep configuration related to a beamforming mode based at least in part on any combination of the measurement report or the set of parameters,
the BS sweep configuration or the repeater sweep configuration indicating whether a beam in a certain beam direction is to be excluded when the certain beam direction is blocked or overlaps with a covered region of another repeater or another BS; and receiving, at the repeater using the repeater sweep configuration, initial beam sweeping results information from the BS in accordance with the BS sweep configuration.

22. The method of claim 21, wherein the repeater sweep configuration comprises:
a number of SSBs to forward to a UE and a number of beams to use for forwarding the number of SSBs under the beamforming mode.

23. The method of claim 21, further comprising:
performing, for the measurement report, a measurement of any combination of:
downlink signals received from the BS or another BS;
a measurement of uplink signals from a UE to the BS; and
a presence of a blocker or reflector spaced away from the repeater.

24. The method of claim 21, wherein the set of parameters relating to the capability of the repeater comprises any combination of:
codebook information of the repeater;
an architecture of the repeater;
a beam switching latency of the repeater; and
a synchronization level of the repeater.

25. The method of claim 21, further comprising:
transmitting the set of parameters relating to the capability of the repeater to the BS from the repeater during an initial connection setup between the BS and the repeater.

26. A repeater of wireless communication, comprising:
a transceiver configured to:
transmit, to a base station (BS), at least one of a measurement report or a set of parameters relating to a capability of the repeater;
receive, from the BS, a BS sweep configuration related to characteristics of synchronization signal blocks (SSBs) to be used for sweeping, or a repeater sweep configuration related to a beamforming mode for the repeater based at least in part on any combination of the measurement report or the set of parameters,
the BS sweep configuration or the repeater sweep configuration indicating whether a beam in a certain beam direction is to be excluded when the certain beam direction is blocked or overlaps with a covered region of another repeater or another BS; and
receive, at the repeater using the repeater sweep configuration, initial beam sweeping results information from the BS in accordance with the BS sweep configuration.

27. The repeater of claim 26, wherein the repeater sweep configuration comprises:
a number of SSBs to forward to a UE and a number of beams to use for forwarding the number of SSBs under the beamforming mode.

28. The repeater of claim 26, further comprising:
a processor configured to perform, for the measurement report, a measurement of any combination of:
downlink signals received from the BS or another BS;
a measurement of uplink signals from a UE to the BS; and
a presence of a blocker or reflector spaced away from the repeater.

29. The repeater of claim 26, wherein the set of parameters relating to the capability of the repeater comprises any combination of:
codebook information of the repeater;
an architecture of the repeater;
a beam switching latency of the repeater; and
a synchronization level of the repeater.

30. The repeater of claim 26, wherein the transceiver is further configured to:
transmit the set of parameters relating to the capability of the repeater to the BS from the repeater during an initial connection setup between the BS and the repeater.

* * * * *